United States Patent
Rajagopal et al.

(10) Patent No.: US 10,350,524 B2
(45) Date of Patent: Jul. 16, 2019

(54) FILTER DEVICE

(71) Applicant: MANN+HUMMEL GMBH, Ludwigsburg (DE)

(72) Inventors: Madhu Kumar Rajagopal, Bangalore (IN); Prashanth Mari Ambanna, Bangalore (IN)

(73) Assignee: MANN+HUMMEL GmbH, Ludwigsburg (DE)

(*) Notice: Subject to any disclaimer, the term of this patent is extended or adjusted under 35 U.S.C. 154(b) by 0 days.

(21) Appl. No.: 15/484,556

(22) Filed: Apr. 11, 2017

(65) Prior Publication Data
US 2017/0291127 A1    Oct. 12, 2017

(51) Int. Cl.
*B01D 35/30*   (2006.01)
*B65D 45/34*   (2006.01)

(52) U.S. Cl.
CPC ............ *B01D 35/30* (2013.01); *B01D 35/306* (2013.01); *B01D 2201/4023* (2013.01); *B65D 45/345* (2013.01)

(58) Field of Classification Search
CPC .. B01D 35/30; B01D 35/306; B01D 46/0002; B01D 46/0004; B65D 45/32; B65D 45/34; B65D 45/345; F02M 35/0203
See application file for complete search history.

(56) References Cited

U.S. PATENT DOCUMENTS

| | | | |
|---|---|---|---|
| RE26,127 E * | 12/1966 | Wade | F16L 21/06 220/321 |
| 4,267,940 A * | 5/1981 | Wade | B65D 45/345 220/316 |
| 5,730,769 A | 3/1998 | Dungs et al. | |
| 6,306,192 B1 | 10/2001 | Greif | |
| 2012/0112476 A1 | 5/2012 | Kuzelka | |

FOREIGN PATENT DOCUMENTS

| | | |
|---|---|---|
| DE | 1475034 A1 | 4/1969 |
| DE | 102013203098 A1 | 8/2014 |

* cited by examiner

*Primary Examiner* — Terry K Cecil
(74) *Attorney, Agent, or Firm* — James Hasselbeck

(57) ABSTRACT

A filter device has a filter housing and a clamping bracket engaging around the filter housing. The clamping bracket includes a bracket and a clamping collar that are swivelably coupled by a hinge, the bracket and the clamping collar being positively connected adjacent to the hinge through the engagement of a projection into an engagement window.

10 Claims, 4 Drawing Sheets

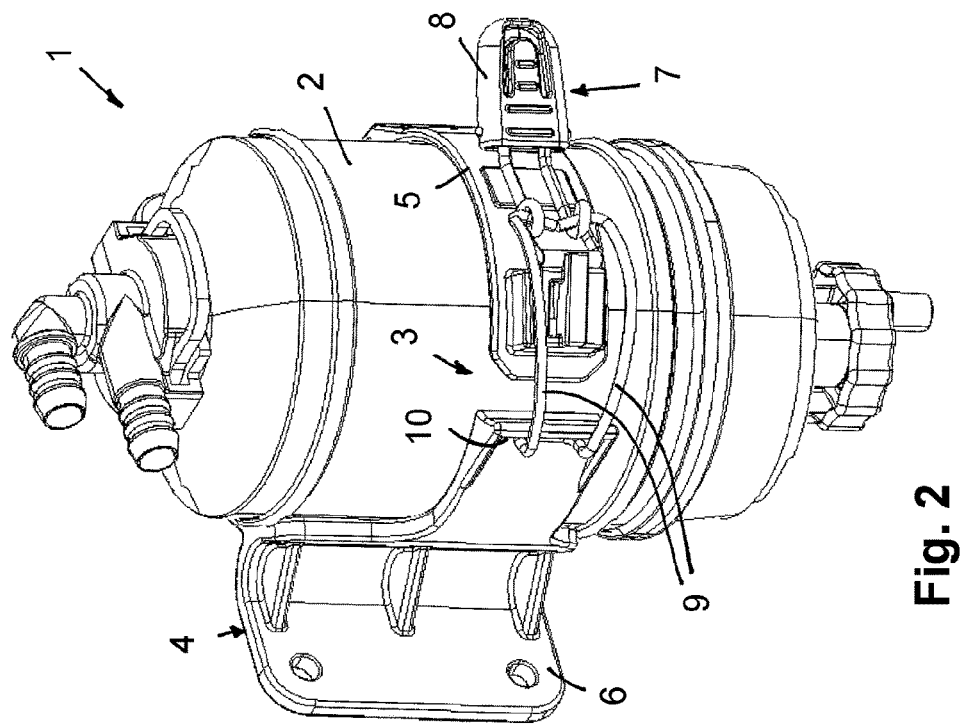
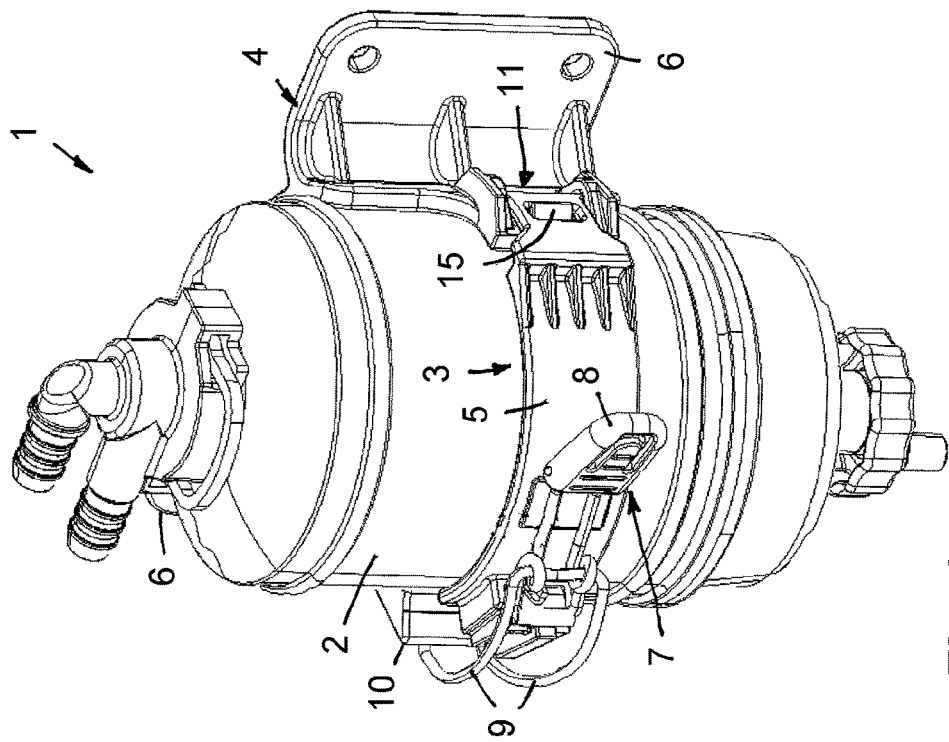
Fig. 1
Fig. 2

FILTER DEVICE

TECHNICAL FIELD

The invention relates to a filter device, particularly for liquid filtration, with a filter housing and a clamping bracket engaging around the filter housing.

BACKGROUND

Filters with a filter element in a filter housing that can be fixed in the vehicle with the aid of a clamping bracket are known from DE 42 41 586 C1, for example. For example, the clamping bracket is embodied as a clamping collar that encloses the housing in the manner of a ring and can be fixed to the housing with the aid of a clamping device.

DISCLOSURE OF THE INVENTION

It is the object of the invention to securely fasten a filter device in a structurally simple manner to a receiving component, for example in a motor vehicle.

The filter device according to the invention can be used for liquid filtration, for example for fuel filtration in a motor vehicle. Other applications for gas filtration are also possible, however, such as the filtration of the combustion air of a combustion engine.

The filter device has a filter housing which may have a round, especially circular circumference. The filter housing is engaged around by a clamping bracket by means of which the filter device can be fastened to the other component. The clamping bracket especially engages the filter housing along the circumference of the filter housing. The clamping bracket rests against the housing outer side of the filter housing and can be adjusted between a relaxed state in which the clamping bracket can be removed or placed onto the housing and a tensioned state in which the clamping bracket is under tension along the circumference of the housing and exerts a clamping force on the filter housing and is fixed to the filter housing.

The clamping bracket advantageously also has a mounting means that can be fastened to another component, for example a carrier on the vehicle. The filter device can thus be fastened by means of the mounting means and the clamping bracket to the other component on the vehicle, such as the carrier, for example.

The clamping bracket of the embodiment according to the invention comprises a clamp and a clamping collar, which are coupled in a swiveling manner by a hinge. Both the bracket and the clamping collar rest directly or indirectly against the outside of the filter housing and exert a clamping force on the housing. In addition to the coupling in a swiveling manner, the hinge may have a second degree of freedom along the circumference which allows for a movement of the hinge along the circumference, preferably for a limited distance of around 3-20 mm. Thus, the hinge preferably is embodied as a hinge with an axis of rotation that can be moved along the circumference.

Upon tightening, the bracket and the clamping collar perform a swiveling movement relative to one another that is enabled by the connecting hinge between these components. In addition to the hinge, at least one positive connection exists in the tightened state between bracket and clamping collar, particularly in the immediate vicinity of the hinge. In the tightened state, the positive connection transfers a force in the circumferential direction between bracket and clamping collar, thus releasing the hinge from the clamping forces and hence reducing the danger of damage occurring to the connection in the hinge region as a result of the strong clamping forces or also forces caused by vibrations.

The positive connection via the projection that protrudes into the engagement window can also be achieved in a simple manner. For instance, if the bracket and/or the clamping collar are embodied as plastic components, it is possible to manufacture them complete with projection and engagement window using an injection-molding process.

Another advantage lies in the simple and reliable establishment of the positive engagement during the tightening process. As the tension in the clamping collar increases, it abuts against the outside of the filter housing, thus also fixing the projection in the engagement window. The wall framing and delineating the engagement window abuts against the projection, whereby the clamping force acting in the circumferential direction is transferred and the hinge is released at least partially, optionally completely, from the clamping forces.

According to one advantageous embodiment, the projection is arranged on the bracket and the engagement window on the clamping collar. The hinge is advantageously also located on the clamping collar. For example, the hinge is formed by at least one, preferably by two hinge pins, whose pin longitudinal axis lies orthogonal to the circumferential direction. The hinge pin or hinge pins is or are located particularly on the front-side end of the clamping collar. The engagement window is adjacent to this front-side end of the clamping collar, but advantageously at a distance to the pin longitudinal axis, thus preventing the weakening of the clamping collar in the region of the hinge pin or hinge pins. In any case, it is expedient for the hinge and the engagement window to be located adjacent to the same end of the clamping collar. The axis of rotation of the hinge may advantageously be defined by the hinge pins and/or the pin longitudinal axis.

According to an alternative embodiment, the projection is arranged on the clamping collar and the engagement window on the bracket. In this case as well, a positive connection between clamping collar and bracket is achieved. Moreover, it is also possible for the hinge, particularly when it is embodied as one or two hinge pins, to be arranged on the bracket.

In any case, the positive connection exists when the clamping collar is in the tightened state. However, it can also be advantageous for the projection to already protrude into the engagement window in the relaxed state, in which case the tightening of the clamping collar merely adds the force transmission in the circumferential or tightening direction.

According to yet another expedient embodiment, the hinge has greater bearing clearance in the circumferential direction than the projection engaging in the engagement window. This embodiment ensures that, upon tightening of the clamping sleeve, the force transmission occurs via the projection and the wall that delimits the engagement window and not, or only to a small extent, via the hinge. By virtue of its bearing clearance, the hinge can be displaced in the circumferential direction during the tightening process, whereas the projection reaches a force-transmitting abutment against the wall of the engagement window earlier during tightening due to the lesser amount of clearance there. This may have the advantage that, in a tightened state, the positive connection, which may be embodied with a projection and an engagement window, inhibits a movement of the clamping collar in the direction of tension, i.e. in the direction defined by the direction in which the clamping collar extends from the hinge, while at the same time the hinge still has clearance in this direction and this is not under load and not taking up any forces.

According to another advantageous embodiment, the bearing clearance of the hinge is achieved in that one or two hinge pins protrude into a recess and the hinge pin or hinge pins are received in the recess with clearance. The recess can have an oblong shape, for example a crescent shape, extending in the circumferential direction.

The hinge pin or hinge pins protruding into the recess advantageously have a round cross-sectional shape.

According to yet another expedient embodiment, the clamping collar has a tensioner on the end opposite the hinge with which the clamping collar is displaced between the relaxed and tightened state. In the tightened state, the connection to the opposite end of the bracket is established via the tensioner, thus also generating sufficient clamping force. The tensioner comprises a tension lever, for example, and at least one tensioning hook that can be hooked on the opposite end of the bracket and tightened by means of the tension lever. Preferably, the tensioner is part of the clamping collar and/or permanently fixed to the clamping collar. Also preferably, the tensioner is configured to be detachably connectable to the bracket.

In one further aspect, the features described in the previous paragraph define an independent invention. Therefore, in one further aspect, the object of the invention is solved by a filter device with a filter housing and with a clamping bracket engaging around the filter housing, characterized in that the clamping bracket comprises a bracket and a clamping collar that are swivelably coupled by means of a hinge, the clamping collar having a tensioner on the end opposite the hinge with which the clamping collar is displaced between the relaxed and tightened state. This filter device may in advantageous embodiments of course comprise a variety of other features as described in this disclosure.

The invention further relates to a clamping bracket for a filter device in which the clamping bracket is constructed in the aforedescribed manner and has a clamping collar, and in which the bracket and clamping collar are connected via a hinge and additionally by means of a positive engagement of a projection into an engagement window.

BRIEF DESCRIPTION OF THE DRAWINGS

Additional advantages and expedient embodiments can be derived from the other claims, the description of the figures and the drawings.

FIG. 1 shows a perspective view of a filter device for liquid filtration with a clamping bracket engaging around the filter housing, FIG. 2 shows the filter device in another perspective view.

In the figures, similar components are designated by the same reference symbols.

DETAILED DESCRIPTION

Figure 3:
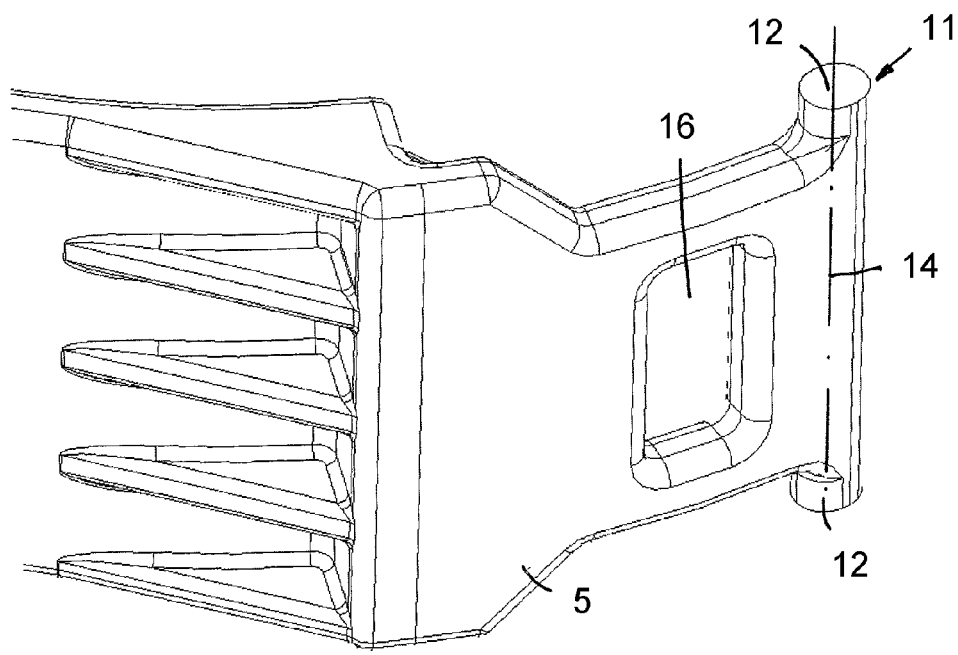
FIG. 3 shows a section of a clamping collar of the clamping bracket with two hinge pins forming a hinge, and an engagement window.

FIGS. 1 and 2 each show a perspective view of a filter device 1 that is used in a motor vehicle, preferably for liquid filtration, for example for fuel filtration. The filter device 1 has a cylindrical housing 2 around which a clamping bracket 3 with a bracket 4 and a clamping collar 5 is disposed. The bracket 4 has two laterally projecting mounting wings 6 by means of which the filter device 1 can be fastened to another component, for example a carrier in the motor vehicle. Holes are disposed in the mounting wing for screws.

Figure 7:
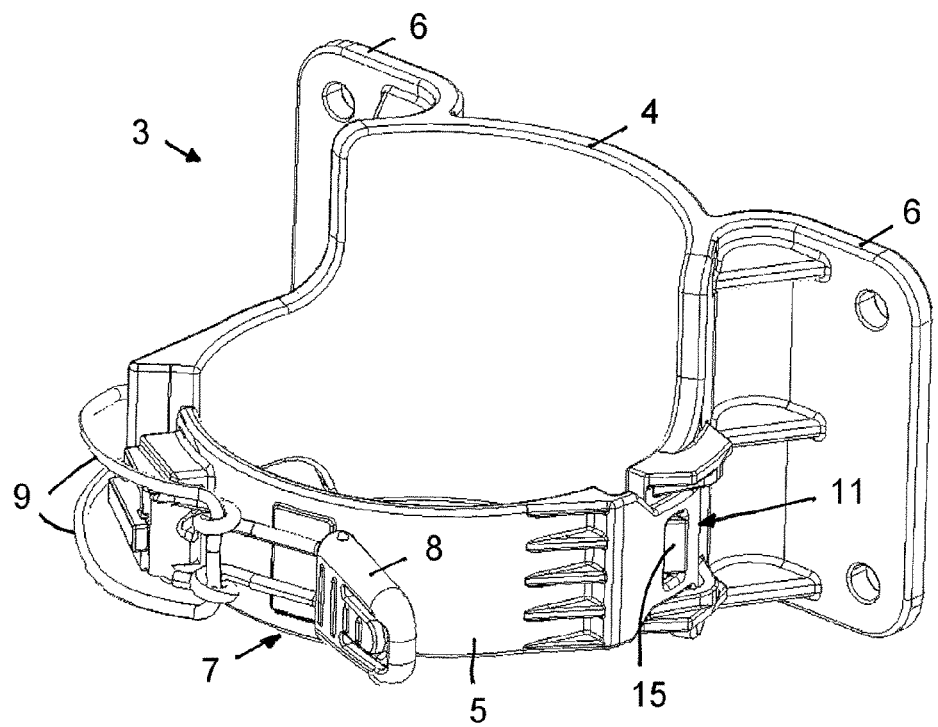
FIG. 7 shows a perspective view of the bracket and the clamping collar.
Figure 8:
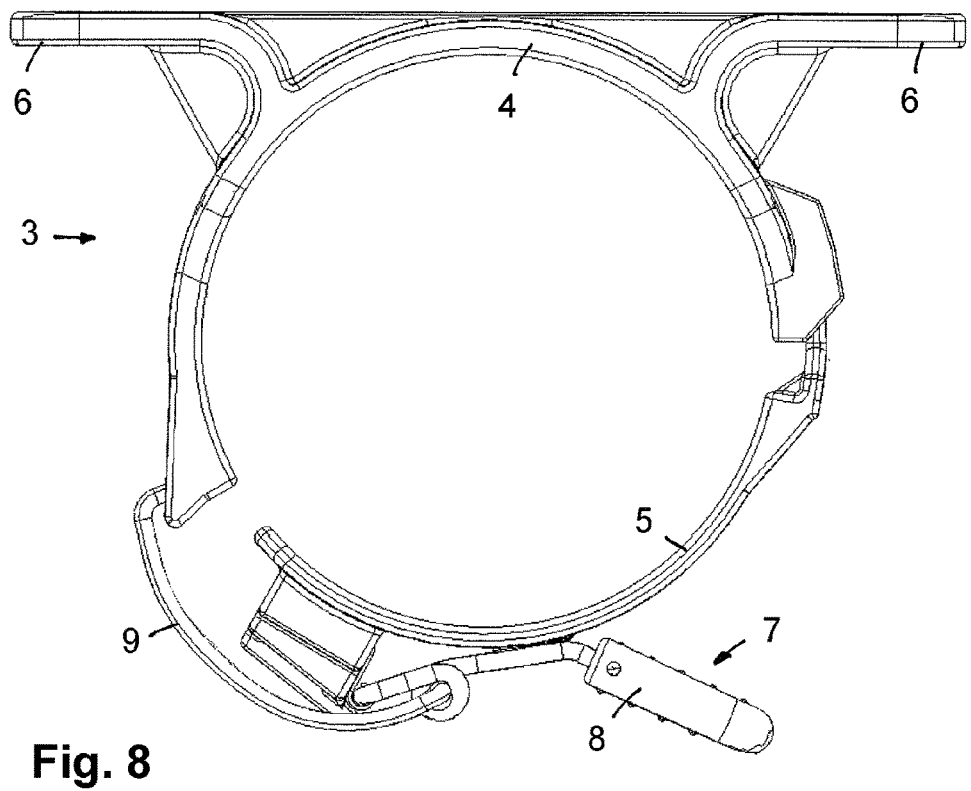
FIG. 8 shows a top view of the bracket and the clamping collar.

The bracket 4 and the clamping collar 5 (shown individually in FIGS. 7 and 8) engage around the outside of the filter housing 2 over a respective angular segment, the bracket 4 extending over slightly greater than 180° and the clamping collar over slightly less than 180° of the periphery. The clamping collar 5 is provided with a clamping device 7 that comprises a tension lever 8 and a tensioning hook 9, which can be moved by the tension lever 8 between a relaxed and tightened state. The free ends of the tensioning hook 9 engage around an offset 10 on a front-side end of the bracket 4. In the tightened state, the tensioning hook 9 forming a tension spring generates a clamping force in the circumferential direction that extends circumferentially over the bracket 4 and the clamping collar 5 and fixes the clamping bracket 3 with a commensurate retention force to the filter housing 2. The retention and clamping forces are great enough to firmly connect the clamping bracket to the filter housing 2.

As can be seen in FIG. 1 in conjunction with the other figures, the clamping collar 5 is coupled with the bracket 4 on the end opposite the clamping device 7 in a swivelable manner by means of a hinge 11. The hinge 11 comprises two hinge pins 12 (FIG. 3) on the front-side end of the clamping collar 5 that are integrally formed with same and extend orthogonally to the longitudinal extension that is coincident with the circumferential direction. The hinge pins 12 have a round cross-sectional shape and project upward and downward transverse to the longitudinal extension over the side edges of the clamping collar 5.

Figure 5:
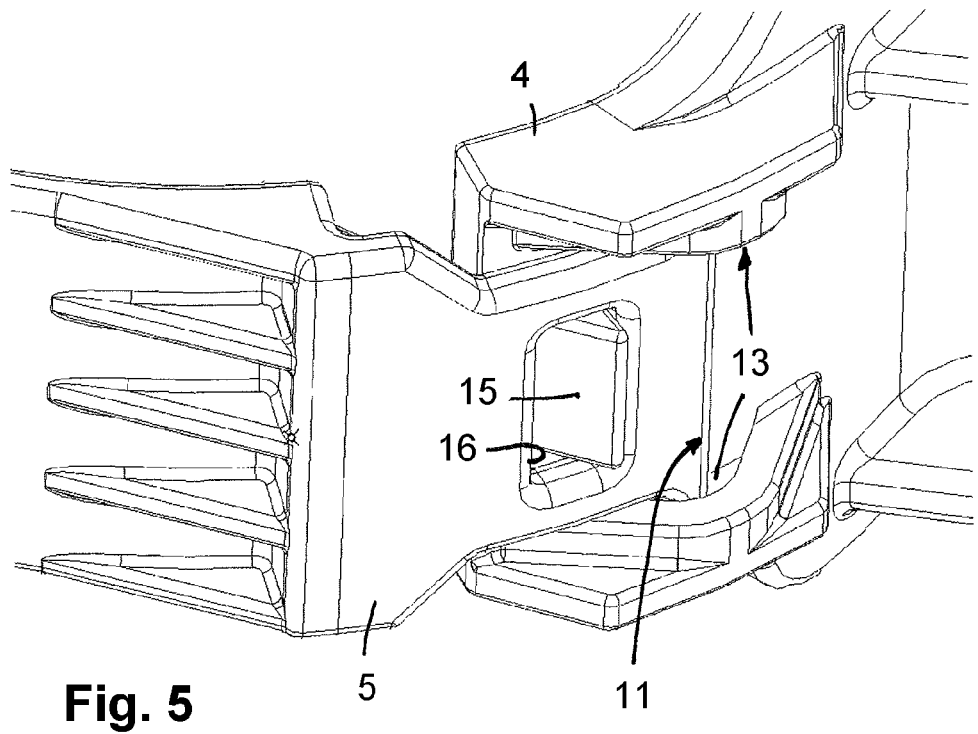
FIG. 5 shows clamping collar and bracket in the assembled state, in which the projection protrudes into the engagement window.
Figure 6:
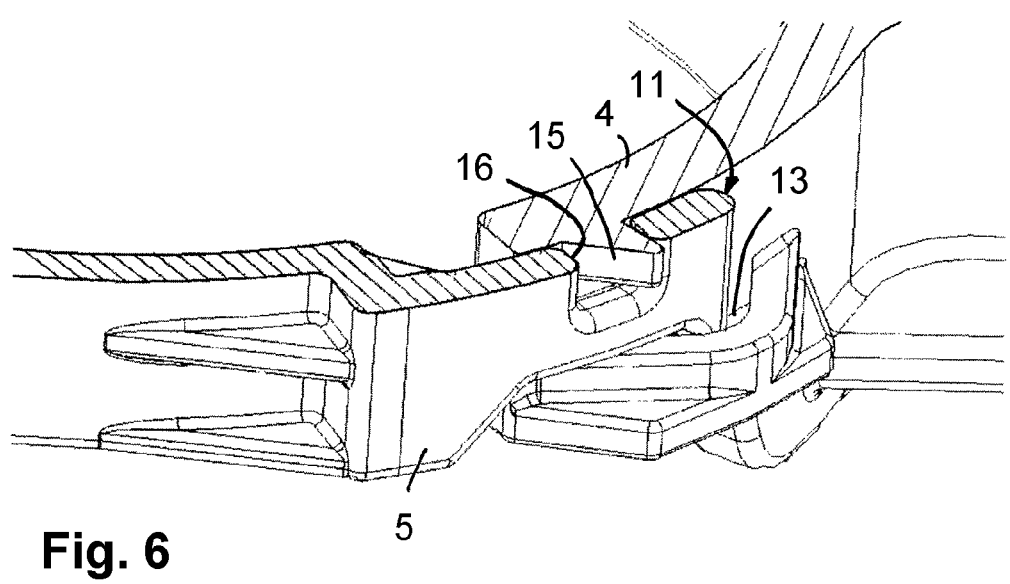
FIG. 6 shows the representation according to FIG. 5, but in a section through the projection and the engagement window.

The hinge pins 12 protrude into associated crescent-shaped recesses 13 (FIGS. 4 to 6) that are disposed in the bracket 4 adjacent to the front side and formed integrally with same. The clamping collar 5 can thus perform a swiveling movement in relation to the bracket 4 around the pin longitudinal axis 14 that extends orthogonal to the longitudinal and circumferential direction of the clamping collar 5.

An engagement window 16 having a rectangular cross-sectional shape is disposed in the clamping collar 5 adjacent to the hinge pins 12. A projection 15 having a triangular cross-sectional shape disposed on the front-side end of the bracket 4 is associated with the engagement window 16 and protrudes into the engagement window 16 at least in the tightened state, and optionally in the relaxed state as well. This results in a positive connection in the circumferential and clamping direction between the bracket 4 and the clamping collar 5 as the projection 15 abuts against the wall adjacent to the engagement window 16.

In order to relieve the hinge 11 of forces in the tightened state, the hinge pins 12 abut with sufficient bearing clearance against the bracket 4 in the recess 13. The bearing clearance between the hinge pins 12 and the recess 13 ensures that, in the tightened state, the clamping force is transmitted exclusively or at least for the most part between the projection 15 and the walls adjacent to the engagement window 16. Accordingly, the hinge pins 12 on the clamping collar 5 are relieved of the clamping forces.

Figure 4:
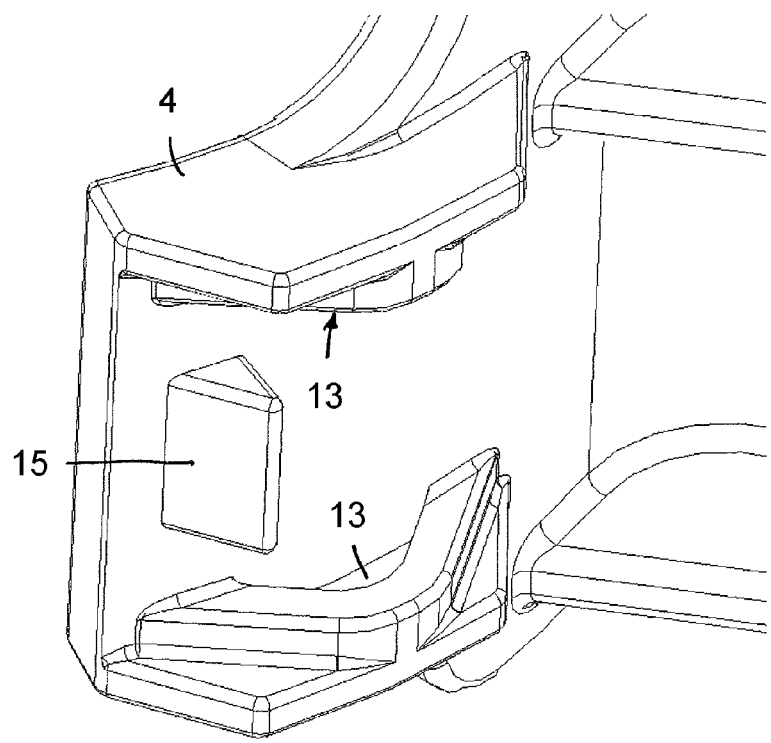
FIG. 4 shows a section of a bracket that cooperates with the clamping collar, with recesses for receiving the clamping pin and with a triangular projection.

As can be seen particularly in FIG. 4, the recesses 13 have an oblong, almost crescent or triangular cross-sectional shape in the circumferential direction. The recess 13 is delineated by a commensurately shaped wall section that is embodied integrally with the bracket 4.

What is claimed is:

1. A filter device for liquid filtration, comprising:
   a filter housing including a filter element therein;
   a clamping bracket arranged on the filter housing and engaging around the filter housing;
   wherein the clamping bracket includes:
      (i) a bracket comprising
         at least one laterally-projecting mounting wing for attaching the filter device to a receiving component;
         a first end including a hinge receiving area and a projection; and
         a second end including an offset; and
      (ii) a clamping collar comprising
         a first end including a hinge and an engagement window; and
         a second end including a tensioner for engaging said offset;
         the hinge positioned within the receiving area and swivelably coupling the bracket to the clamping collar;
      wherein the bracket and the clamping collar cooperate to surround the filter housing in a circumferential direction and are positively connected adjacent to the hinge through the engagement of a projection into the engagement window.

2. The filter device as set forth in claim 1, wherein the projection is arranged on the bracket, and
   wherein the engagement window is arranged on the clamping collar.

3. The filter device as set forth in claim 2, wherein the hinge is arranged nearer to an end of the clamping collar than the projection.

4. The filter device as set forth in claim 1, wherein the hinge has a greater bearing clearance in the circumferential direction than a clearance of the projection engaging in the engagement window.

5. The filter device as set forth in claim 1, wherein the hinge comprises at least one hinge pin on the clamping collar, the pin having an longitudinal axis running orthogonal to a circumferential direction of clamping collar around the filter housing.

6. The filter device as set forth in claim 5, wherein the engagement window is formed in the clamping collar and is spaced away from the pin longitudinal axis.

7. The filter device as set forth in claim 1, wherein the tensioner is arranged on an end of the clamping collar opposite the hinge.

8. The filter device as set forth in claim 1, wherein the projection has a triangular cross-sectional shape.

9. The filter device as set forth in claim 1, wherein the hinge comprises at least one hinge pin and a recess into which the hinge pin protrudes.

10. The filter device as set forth in claim 9, wherein the recess is an oblong recess, the recess elongated in the circumferential direction such that the hinge pin has an axis of rotation that is moveable in the circumferential direction within the oblong recess, such that clamping force is removed from the hinge and is instead carried by the projection engaging the engagement window of the clamping collar.

* * * * *